United States Patent [19]

Paterik, Jr.

[11] 4,235,542
[45] Nov. 25, 1980

[54] SELF STOWING VEHICLE LEVELING HYDRAULIC JACK

[76] Inventor: Frank J. Paterik, Jr., 1485 Floyd Ave., Sunnyvale, Calif. 94087

[21] Appl. No.: 7,166

[22] Filed: Jan. 29, 1979

[51] Int. Cl.³ .............................................. B66F 3/24
[52] U.S. Cl. .................................................. 254/86 H
[58] Field of Search ................... 254/86 H, 86 R, 45; 280/765, 766

[56] References Cited

U.S. PATENT DOCUMENTS

| | | | |
|---|---|---|---|
| 1,823,286 | 9/1931 | Phillips | 254/86 R |
| 1,988,304 | 1/1935 | Duman | 254/86 R |
| 2,442,881 | 6/1948 | Soskin | 254/86 H |
| 2,837,312 | 6/1958 | Troche | 254/86 H |
| 2,882,070 | 4/1959 | Bill | 254/86 H |
| 3,362,683 | 1/1968 | Hansen | 254/86 H |
| 3,749,363 | 7/1973 | Hauser | 254/45 |
| 3,817,493 | 6/1974 | Hansen | 254/86 R |
| 3,909,040 | 9/1975 | Visser | 280/765 |

Primary Examiner—Robert C. Watson
Attorney, Agent, or Firm—Harry E. Aine; Harvey G. Lowhurst

[57] ABSTRACT

In a self stowing vehicle leveling hydraulic jack, a cylindrical ram housing is pivotably affixed to the vehicle to be leveled. A cylindrical hydraulically actuated ram is carried within the cylindrical ram housing in a telescoping manner. An electrical motor is contained within the ram. The motor drives a hydraulic pump, also contained in the ram. The output of the pump passes through a control valve for selectively valving the hydraulic fluid between a ram extension chamber and a ram retracting chamber for selectively extending or retracting the telescoping ram. A cam follower, carried from the ram, follows a cam track eccentrically mounted relative to the pivotable axis of the ram housing for pivoting the retracted telescoping jack into a self stowing position. A valve traps the hydraulic fluid in the retracting chamber for holding the retracted jack in the self stowed position.

2 Claims, 4 Drawing Figures

U.S. Patent
Nov. 25, 1980
4,235,542
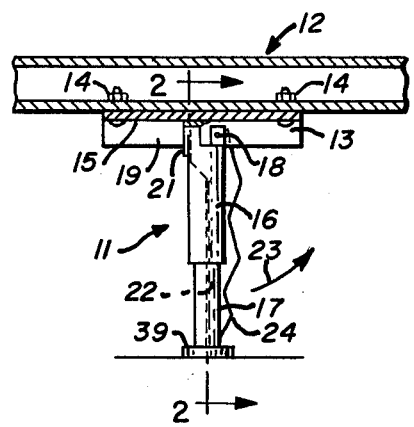
Fig_1
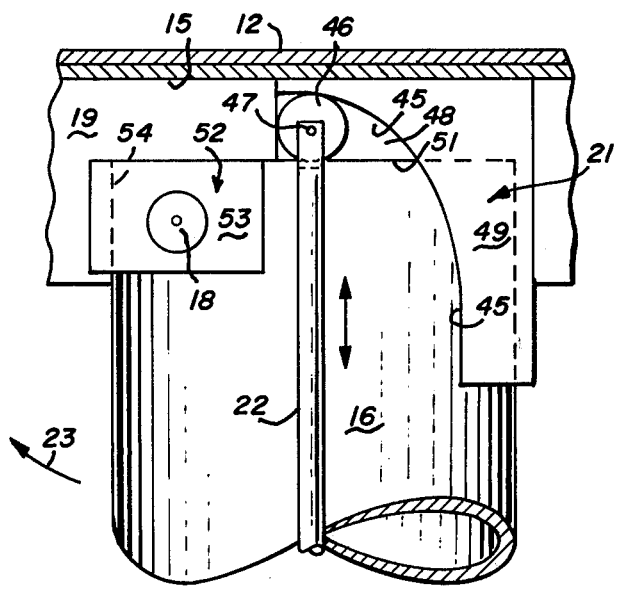
Fig_3
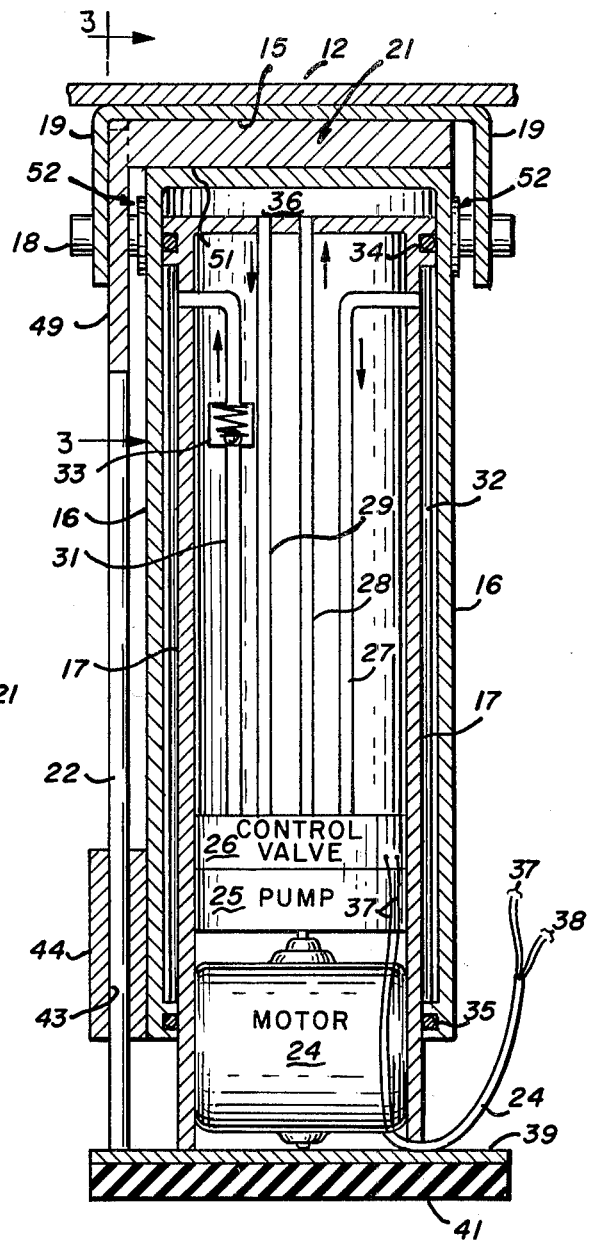
Fig_2
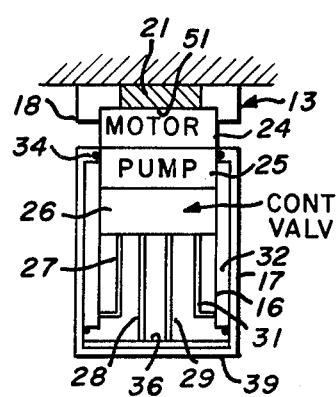
Fig_4

SELF STOWING VEHICLE LEVELING HYDRAULIC JACK

GOVERNMENT RIGHTS

This invention is a subject invention developed under a Government contract and the U.S. Government has royalty-free license rights to utilize the invention.

BACKGROUND OF THE INVENTION

The present invention relates in general to self stowing vehicle leveling jacks and, more particularly, to an improved leveling jack of the hydraulic type.

DESCRIPTION OF THE PRIOR ART

Heretofore, self stowing vehicle leveling motorized jacks have employed a chain and sprocket arrangement for effecting telescopic motion of the jack and self stowing thereof. Such a jack is disclosed in U.S. Pat. No. 3,984,082 issued Oct. 5, 1976.

While the aforecited chain actuated motorized jack has proven suitable for leveling of recreation vehicles such as motorized homes, trailers, and the like, it is desired to provide such a jack which is less complicated of construction and one which preferably is actuated hydraulically rather than by means of a motorized chain drive.

It is also known from the prior art of vehicle lifts, such as those employed for automobile servicing and repair, to include an electrical motor and hydraulic pump within a ram, telescopically mounted within a housing embedded in the ground. Such lifts are relatively large and expensive when compared to the aforecited vehicle leveling jacks. Examples of this type of lift are found in the following U.S. Pat. Nos.: 1,784,554 issued Dec. 9, 1930, and 1,803,682 issued May 5, 1931.

SUMMARY OF THE PRESENT INVENTION

The principal object of the present invention is the provision of an improved self stowing vehicle leveling hydraulic jack.

In one feature of the present invention, a hydraulic ram is telescopically mounted relative to a ram housing and they are pivotably affixed to and dependent from the vehicle to be leveled. A cam track and a cam follower, operatively associated with the ram, are eccentrically mounted relative to the pivoting axis of the jack for causing the ram and ram housing to pivot into the self stowing position upon complete retraction of the ram relative to the ram housing.

In another feature of the present invention, a valve serves to trap the hydraulic fluid in the ram retracting chamber for holding the jack in the self stowed position.

Other features and advantages will become apparent upon a perusal of the following specification taken in connection with the accompanying drawings wherein:

BRIEF DESCRIPTION OF THE DRAWINGS

FIG. 1 is a side elevational view, partly in section, depicting the self stowing vehicle leveling hydraulic jack of the present invention in the extended position, FIG. 2 is an enlarged sectional view of a portion of the structure of FIG. 1 taken along line 2—2 in the direction of the arrows, FIG. 3 is an enlarged sectional view of a portion of a structure of FIG. 2 taken along line 3—3 in the direction of the arrows, and FIG. 4 is a schematic drawing similar to FIG. 2 depicting an alternative embodiment of the present invention.

DESCRIPTION OF THE PREFERRED EMBODIMENTS

Referring now to FIG. 1 there is shown the self stowing vehicle leveling hydraulic jack 11 incorporating features of the present invention. The jack 11 is mounted to a horizontal structural member 12 of the vehicle, such as a channel member, via a channel mounting bracket 13 carried from the channel member 12 as by a plurality of bolts 14 passing through the side wall of the vehicle channel member 12 and a base portion 15 of the mounting channel bracket 13. The jack 11 includes a hollow cylindrical ram housing member 16 and a hollow cylindrical ram 17 concentrically mounted within the ram housing 16 and arranged for telescopic motion within the ram housing 16. The ram housing 16 is pivotably affixed to the mounting bracket 13 via a pair of axles 18 projecting laterally of the ram housing and passing through aligned bores in the side walls 19 of the mounting bracket 13.

A self stowing cam block 21 is fixedly secured to one of the side walls 19 of the mounting bracket 13 and a cam follower 22, carried from and moveable with the ram 17 rides on the cam block during the near fully retracted terminal motion of the ram for pivoting the jack 11 about the axle 18, in the direction of the arrow 23, into a horizontal self stowing position adjacent the structural member 12 of the vehicle. Electrical power is supplied to an electrical motor 24 within the ram 17 via an electrical cord 24 for causing actuation of the jack 11.

Referring now to FIGS. 2 and 3 the self stowing vehicle leveling hydraulic jack 11 is shown in greater detail. More particularly, the electrical motor 24 is housed in the lower extremity of the hollow cylindrical ram 17. The output shaft of the motor 24 is coupled to a hydraulic pump 25 for driving same. The pump 25 is connected to a pair of ports of a solenoid control valve 26 having two pairs of controlled ports which are connected to respective pipes 27, 28, 29, and 31.

Pipes 27 and 28 serve to direct the hydraulic fluid so as to extend the ram 17. Pipe 27 is the suction pipe and is connected to an annular ram retraction chamber 32 surrounding the ram 17 in the region of space between the ram 17 and the housing 16. The retraction chamber 32 is sealed at opposite ends by a pair of O-rings 34 and 35 disposed within suitable annular grooves in the ram 17 and ram housing 16, respectively. Pipe 28 is the pressure pipe and is connected from the high pressure side of the pump via the solenoid valve 26 to a cylindrical ram extension chamber 36 defined by the cylindrical region of space between the upper closed end of the ram 17 and the upper closed end of the ram housing 16.

In the ram extension mode, hydraulic fluid is drawn from the ram retraction chamber 32 via suction pipe 27, thence directed via control valve 26 through the hydraulic pump 27 and supplied to the ram extension chamber 36 via pressure pipe 28. Electrical control signals for the solenoid control valve 26 and motor 24 are supplied over the four wire cable 24. The solenoid control signals are set to the valve 26 via a pair of leads 37 and the power to the motor 24 is supplied via a pair of leads 38 from a suitable power source via suitable switches. As hydraulic fluid is tranferred from the ram retraction chamber 32 to the ram extension chamber 36, the ram 17 is extended for raising the vehicle. A foot plate 39 is fixedly secured to the lower extremity of the ram 17 and a rubber pad 41 is carried from the underside of the foot plate 39.

In the retraction mode, an opposite electrical signal is switched via a suitable switch over the solenoid control lines 37 to the solenoid control valve for connecting pipes 29 and 31 to the pump 25. Hydraulic fluid is withdrawn by the motor driven pump 25 from the ram extension chamber 36 via suction pipe 29 and supplied under pressure via pressure pipe 31 and check valve 33 to the retraction chamber 32. When the ram 17 nears its terminal retraction limit of motion, i.e., is nearly fully retracted, the cam follower rod 22 carried from the foot plate 39 and guided by an axial bore 43 in a guide block 44 fixedly secured to the ram housing 16, comes into contact with an arcuate cam 45 (see FIG. 3) of cam block 21. The cam follower rod 22 includes a cam follower wheel 46 carried at the upper extremity of the cam rod 22, such wheel 46 being rotatable about an axle 47 pinned to a bifurcated end of the cam rod 22.

The cam track 45 is formed, in part, by an arcuate recess 48 in the cam block 21. The cam track 45 continues as an arcuate inner lip of a dependent side plate portion 49 of the cam block 21. Due to the eccentric mounting of the cam rod 22 relative to the axis of rotation of the axles 18, which pivotably connect the ram housing 16 to the mounting bracket 13, further retractive motion of the ram 17 causes the cam follower 46 to pivot the ram housing 16, in the direction of arrow 23, about the axle 18. This pivoting action continues until the hydraulic jack 11 has pivoted itself into the self stowing position wherein the longitudinal axis of the jack 18 is generally horizontal. When the jack 11 has been pivoted into the fully retracted and stowed position, the motor 24 is deenergized and the hydraulic fluid is trapped in the retraction chamber 32 via the action of the check valve 33. The other two pipes 27 and 28 are valved off from the pump 25 by the action of the solenoid control valve 26 since it only connects one pair of pipes to the pump 25 at any one of its positions.

When it is desired to operate the hydraulic jack for leveling, the control signal to the solenoid control valve 26 is supplied via lines 37 to the control valve for connecting the pump 25 to the ram extension pipes 27 and 28. This starts the extension mode of operation and the cam follower wheel 46 follows the cam track 45 around in the counter clockwise direction, shown in FIG. 3, due to gravity operating on the jack 11, thereby permitting the jack to pivot about the axle 18 in the counter clockwise direction. The pivoting action of the ram housing 16 continues until the upper surface of the ram housing 16 comes into contact with the lower surface of the cam block 21 at 51. Ram extension continues until contact with the ground and thence it begins the lifting phase of the leveling operation.

The axles 18 are affixed to a yoke member 52, which in-turn is affixed to the upper end of the ram housing 16, as be welding. The yoke 52 includes a pair of leg portions 53 extending partially around the circumference of the cylindrical housing 16 and it includes an inner cylindrical saddle 54 conforming to the cylindrical contour of the ram housing 16 to which it is affixed.

As an alternative to the provision of check valve 33, the solenoid valve 26 is a three position valve having a third position which is normally closed. In the normally closed position all pipes 27, 28, 29 and 31 are valved off from each other and from pump 25. In the normally closed position hydraulic fluid can not transfer from the ram retraction chamber 32 to the ram extension chamber thereby locking the hydraulic jack 11 in the stowed position.

The advantage to the self stowing vehicle leveling hydraulic jack 11 of the present invention is that the structure is less complicated than the previous motorized chain driven jack and the self stowing components are less complicated of design, thereby facilitating fabrication and reducing construction costs.

Referring now to FIG. 4 there is shown schematically an alternative embodiment of the jack 11 of the present invention wherein the motor 24, pump 25 and control valve 26 are contained within the ram housing 16 and the ram 17 surrounds the ram housing 16. This embodiment has the advantage that the motor 24, pump 25 and control valve 26 do not move with telescopic motion of the ram 17, thereby facilitating electrical connection to the motor 24 and solenoid 26. However, it has the disadvantage that the external hydraulic seal 34 is more prone to become contaminated with dirt and grit, which can deleteriously affect its operating life.

What is claimed is:

1. In an extendable and retractable motorized hydraulic jack for leveling of a vehicle to which the jack is to be pivotably affixed:
   ram housing means for pivotable attachment to the vehicle to be leveled;
   ram means for telescopic mounting relative to said ram housing means for telescopically axially extending and retracting relative to said ram housing means;
   an electrical motor housed within one of said ram means and said ram housing means;
   a hydraulic pump for being driven by said electrical motor and for containment within one of said ram and ram housing means for pumping hydraulic fluid into a ram extension chamber means formed between said ram housing means and said ram means to cause said ram to move axially of said ram housing means;
   means for pivotably affixing said ram housing means to a vehicle to be leveled;
   self stowing means operatively associated with said ram means and mechanically operatively responsive to telescopic retractive movement of said ram means relative to said ram housing means for pivoting said ram means and said ram housing means, into a stowed position, about the pivoting axis of said pivotable affixing means. said self stowing means including cam means for providing a cam track, cam follower means being arranged for following said cam track, means for producing relative movement of said cam follower means and said cam track, one along the other, with terminal retractive movement of said ram means for causing said ram housing means to be pivoted about said pivotable affixing means into said stowed position;
   retraction chamber means defined by an annular region of space between said ram means and said ram housing means for pressurization with hydraulic fluid for telescopically retracting said ram means relative to said ram housing means, hydraulic conduits interconnecting said hydraulic pump and said ram extension and ram retraction chamber means so that each of said chambers serves as the hydraulic reservoir for the other, and wherein said hydraulic pump means serves to transfer hydraulic fluid between said ram extension chamber means and said ram retraction chamber means via said hydraulic conduits.

2. The apparatus of claim 1 including, valve means in fluid communication with said hydraulic pump and said ram retraction and extension chamber means for checking the flow of hydraulic fluid in said hydraulic conduits there between for retaining the hydrdaulic fluid in said ram retraction chamber for holding the retracted jack in the stowed position.

* * * * *